(12) United States Patent
Zhang

(10) Patent No.: US 11,506,528 B2
(45) Date of Patent: Nov. 22, 2022

(54) RELATING TO INTERFACE DETECTION

(71) Applicant: ROSEMOUNT TANK RADAR AB, Mölnlycke (SE)

(72) Inventor: Jingdong Zhang, Berkshire (GB)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 202 days.

(21) Appl. No.: 16/771,311

(22) PCT Filed: Dec. 17, 2018

(86) PCT No.: PCT/GB2018/053643
§ 371 (c)(1),
(2) Date: Jun. 10, 2020

(87) PCT Pub. No.: WO2019/122831
PCT Pub. Date: Jun. 27, 2019

(65) Prior Publication Data
US 2020/0340845 A1    Oct. 29, 2020

(30) Foreign Application Priority Data
Dec. 19, 2017  (GB) .................................... 1721252

(51) Int. Cl.
*G01F 23/284*    (2006.01)
(52) U.S. Cl.
CPC ................ *G01F 23/2845* (2013.01)
(58) Field of Classification Search
CPC .................................................. G01F 23/2845
See application file for complete search history.

(56) References Cited

U.S. PATENT DOCUMENTS

| 5,675,259 A * | 10/1997 | Arndt ........................ G01F 1/66 324/642 |
| 2004/0169600 A1* | 9/2004 | Haynes .................. G01S 7/282 342/124 |
| 2005/0156607 A1* | 7/2005 | Okamura .............. G01F 23/284 324/639 |
| 2011/0100120 A1* | 5/2011 | Neuburger .......... G01F 23/2845 73/304 R |
| 2011/0214502 A1* | 9/2011 | Zhang ................. G01F 23/2845 73/290 V |
| 2014/0104099 A1 | 4/2014 | Janitch |
| 2015/0276460 A1* | 10/2015 | Georgescu ............ G01F 23/284 342/124 |
| 2016/0231158 A1* | 8/2016 | Weinzierle .............. G01F 25/20 |
| 2017/0356784 A1 | 12/2017 | Griessbaum |

FOREIGN PATENT DOCUMENTS

WO    WO 2010/064023    6/2010

OTHER PUBLICATIONS

International Search Report from PCT/GB2018/053643, dated Mar. 19, 2019.

(Continued)

*Primary Examiner* — Marcus E Windrich
(74) *Attorney, Agent, or Firm* — Westman, Champlin & Koehler, P.A.

(57) ABSTRACT

A point level switch for industrial interface detection is described, the switch including a microwave waveguide sensor in place of the more commonly encountered vibrating fork.

18 Claims, 5 Drawing Sheets

(56) References Cited

OTHER PUBLICATIONS

Written Opinion of the International Searching Authority from PCT/GB2018/053643, dated Mar. 19, 2019.
"Analysis of an Open-Ending Coaxial Probe with Lift-Off for Nondestructive Testing" by J. Baker-Jarvis et al., IEEE Transactions on Instrumentation and Measurement, vol. 43, No. 5, Oct. 1994, 8 pgs.

* cited by examiner

RELATING TO INTERFACE DETECTION

CROSS-REFERENCE TO RELATED APPLICATION

This Application is a Section 371 National Stage Application of International Application No. PCT/GB2018/053643, filed Dec. 17, 2018 and published as WO 2019/122831 on Jun. 27, 2019, in English, the contents of which are hereby incorporated by reference in their entirety.

FIELD OF THE INVENTION

This invention relates to interface detection and, in particular, to a microwave-based switch for use in industrial interface detection including, but not necessarily limited to, liquid-gas (air), liquid-liquid, solid-gas (air), and solid-solid interface detection.

BACKGROUND TO THE INVENTION

There is a well-known and widespread requirement for devices that can detect a material interface, particularly a liquid/gas (air) interface, and respond by initiating a switching function. Examples include well-known vibrating fork level switches such as the 2100 series of point level switches manufactured and sold by the present applicant in which the frequency of vibration changes when there is a change in medium in contact with the fork. The construction and operation of such switches are well known to those skilled in the art but it is recognized that these types of device can exhibit a number of limitations including:
i) They are sensitive to mounting conditions;
ii) Reliable functioning at process temperatures greater than 260° C. can be difficult to achieve; and
iii) the fork tines are susceptible to damage.

Another form of interface detection device is described in published International (PCT) Patent Application No. WO2010/064023. This device uses the principle of time domain reflectometry (TDR) in which the time interval between an emitted pulse and a resultant reflected pulse is dependent on the medium in contact with the TDR transmission line. To achieve a reliable switching function for the time difference, the probe must, in general. project at least 50 mm from the open end of the co-axial waveguide. This makes devices of this type unsuitable for industrial applications where space is limited or where a flush end to the device is required.

A further alternative form of interface for level detection has been proposed in the form of a microwave probe as described in U.S. Pat. No. 5,675,259. The described probe comprises first and second electrodes in concentric relationship and electrically insulated from one another, an end of the probe being exposed to the media being sensed. Radio frequency signals are transmitted to the probe and phase and amplitude differences associated with the signals reflected from the open end of the probe in contact with the media are analysed to identify the media based on its complex permittivity.

A considerable number of studies have been directed to devices of this type when used to measure permittivity, see for example J Baker-Jarvis et al *Analysis of an open-ended coaxial probe with lift-off for nondestructive testing* IEEE transactions on Instrumentation and Measurement Volume 43, Issue 5, October 1994, however the design philosophy behind probes of this type require the impedance along the sensor body to be maintained at a substantially constant level, e.g. about 50 ohms, along the length of the probe body and a wide useable frequency band can be achieved by carefully choosing the ratio of outside diameter to inside diameter of the probe, together with the permittivity of the insulating material separating the electrodes.

Although existing open-ended microwave probes may offer the potential to address some of the shortcomings of traditional vibrating fork sensors in practice, because of the limited diameter of the aperture typically available through which to mount a level switch, there is a limitation on the diameter of the open end of the probe resulting in relatively low reflection from the open end and, in turn, a lack of sensitivity. As can be seen from FIG. 4B herein, the difference in amplitude of the reflected signals from media of significantly different permittivities is only about 4-6 dB and thus, without high performance and high cost drive and processing electronics, such a sensor would be challenged to distinguish between media in contact with the probe where the different media have low permittivities (in the order of 2-4) near to the permittivity of air (~1)

It is an object of the invention to provide a method and/or apparatus to check switch function that will go at least some way in addressing the aforementioned problems; or which will at least provide a novel and useful choice.

SUMMARY OF THE INVENTION

Accordingly, in a first aspect, the invention provides a level switch operable to initiate a switching function in the event of a change of medium in contact with said switch, said switch including a sensor operable to sense a change of medium in contact with said switch, and drive and processing electronics configured and operable to provide drive signals to said sensor, to receive and process received signals from said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, said sensor having a connection end for connection to said drive and processing electronics, a distal end for contact with said medium, and a length L wherein said sensor is configured to create an impedance mismatch at or adjacent to said connection end.

Preferably said sensor has a main waveguide section of impedance Z and wherein said impedance mismatch comprises a reflection section configured to have an impedance of greater than 1.5 Z.

Preferably said reflection section is configured to have an impedance of substantially 4 Z.

Preferably said reflection section comprises a cavity which is evacuated, or filled with air or a low permittivity foamed material.

Preferably said sensor is configured to operate within a selected frequency band having a substantially central frequency $f_0$ with a wavelength $\lambda$ and wherein said impedance mismatch has a dimension in the direction of length L of a multiple of substantially $\frac{1}{4}\lambda$.

Preferably said main waveguide section has a dimension in the direction of L which is a multiple of $\frac{1}{2}\lambda$.

Preferably said sensor further includes a pressure resisting section extending between said inner and outer electrodes, said pressure resisting section having a dimension in the direction of L which is a multiple of $\frac{1}{2}\lambda$.

Preferably said pressure resisting section is positioned within the length of said main waveguide section.

Preferably the distance between an edge of said pressure resistant section and an end of said main waveguide section is a multiple of ½λ.

Preferably an expansion section is formed at said distal end in which said inner electrode is expanded in diameter and said outer electrode is reduced in thickness to accommodate the expansion.

Preferably the dimension of said expansion section in the direction of L is a multiple of ½λ.

Preferably at said distal end said inner electrode projects beyond said outer electrode in the direction of L by an amount of the order of ⅒λ.

Preferably an insulating coating is provided over said distal end to prevent short-circuiting between said inner and outer electrodes.

Preferably said outer electrode and said inner electrode are substantially co-axial.

Preferably said processing electronics is configured to reduce the frequencies of said received signals before processing into a determination of a switching point.

In a second aspect the invention provides a level switch operable to initiate a switching function in the event of a change of medium in contact with said switch, said switch including a sensor operable to sense a change of medium in contact with said switch, and drive and processing electronics configured and operable to provide drive signals to said sensor, to receive and process received signals from said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, said sensor having a connection end for connection to said processing electronics, a distal end for contact with a medium, and a length L and wherein said sensor is configured to operate within a frequency band having a frequency $f_0$ with wavelength λ located substantially centrally within said band, said sensor including at least one impedance mismatch having a dimension in the direction of length L related to λ.

In a third aspect the invention provides a level switch operable to initiate a switching function in the event of a change of medium at a level of said switch, said switch including a sensor operable to sense a change of medium at a level of said switch, and drive and processing electronics configured and operable to provide drive signals to said sensor, to receive and process received signals from said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, said sensor having a connection end for connection to said drive and processing electronics, a distal end for mounting in substantial contact with a wall of a non-conductive vessel containing said medium or in conduct with a non-conductive window provided in a wall of a vessel containing said medium, said sensor having a length L wherein said sensor is configured to create an impedance mismatch at or adjacent to said connection end.

In a fourth aspect the invention provides a level switch operable to initiate a switching function in the event of a change of medium at a level of said switch, said switch including a sensor operable to sense a change of medium at a level of said switch, and drive and processing electronics configured and operable to provide drive signals to said sensor, to receive and process received signals from said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, said sensor having a connection end for connection to said processing electronics, and a distal end for mounting in substantial contact with a wall of a non-conductive vessel containing said medium or in conduct with a non-conductive window provided in a wall of a vessel containing said medium, said sensor having a length L and wherein said sensor is configured to operate within a frequency band having a frequency $f_0$ with wavelength λ located substantially centrally within said band, said sensor including at least one impedance mismatch having a dimension in the direction of length L related to λ.

Many variations in the way the present invention can be performed will present themselves to those skilled in the art. The description which follows is intended as an illustration only of one means of performing the invention and the lack of description of variants or equivalents should not be regarded as limiting.

BRIEF DESCRIPTION OF THE DRAWINGS

One working embodiment of the invention will now be described with reference to the accompanying drawings in which.

DETAILED DESCRIPTION OF WORKING EMBODIMENT

Figure 1:
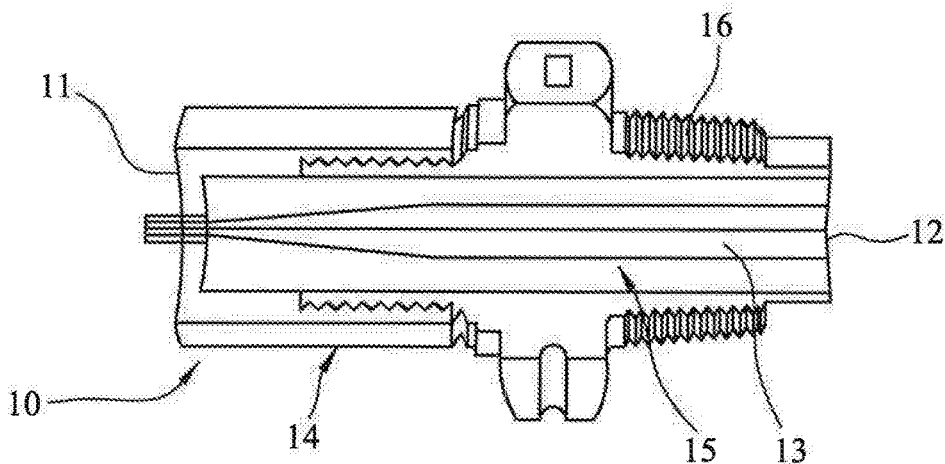
FIG. 1: shows a cross-section through a prior art open-ended waveguide sensor.

Referring firstly to FIG. 1, a typical prior art open-ended waveguide sensor 10 is shown in FIG. 1 but reference can also be made to U.S. Pat. No. 5,675,259 which contains a detailed description of the construction and operation of such a sensor as well as various industrial applications in which a sensor of this type can be used. In the form shown in FIG. 1, the sensor 10 has a connection end 11 and a distal end 12 for contact with a fluid which, in the context of this disclosure, includes gases, liquids and fine solids such as powders. The sensor 10 includes an inner electrode 13, an outer electrode 14, the electrodes 13 and 14 held in spaced relationship (typically co-axial relationship) by an electrically insulating material 15. The electrodes are typically formed from a metal such as stainless steel and the insulating material 15 may comprise a suitable plastics material such as polytetrafluoroethylene (PTFE), or a suitable ceramic.

The outer electrode 14 may comprise the outer body of the sensor which, in the form shown, includes a threaded section 16 to allow the sensor to be mounted in the position in which it is to be used. Typically this will be an aperture of a relatively restricted diameter in the wall of a process vessel.

The sensor shown in FIG. 1 is configured according to design rules which dictate that the impedance of the sensor should be kept as constant as possible along its length and that the sensor should operate over a wide frequency band with the highest possible cut-off frequency; that is to say the highest frequency to maintain transverse electromagnetic (TEM) mode. As will become apparent from the description that follows, this limits the usefulness of an instrument such as a point level switch incorporating the sensor.

Figure 2:
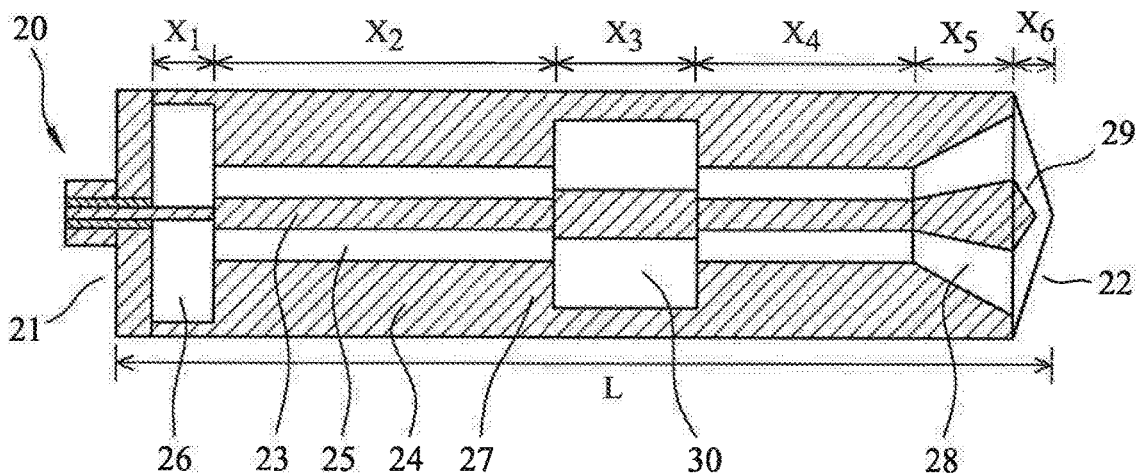
FIG. 2: shows a cross-section through an open-ended waveguide sensor according to the invention.

Turning now to FIG. 2, an open-ended wave-guide sensor 20 incorporated in a level switch according to the invention is configured to different design rules, namely:
  i) The sensor should be optimized around a central working frequency $f_0$ with wavelength $\lambda$;
  ii) the sensor should include a high impedance section having a dimension along the length of the sensor that is a multiple of $\frac{1}{4}\lambda$;
  iii) the lengths of the various sections of the sensor should be multiples of $\frac{1}{2}\lambda$;
  iv) the ratio of diameters of the inner and outer electrodes should be chosen to provide a cut-off frequency that is as high as possible above $f_0$; and
  v) the lateral dimension of the sensor at the distal end should be expanded to improve the sensitivity of the sensor to media of low permittivity.

The sensor 20 has a connection end 21 for connection to drive and processing electronics, a distal end 22 for contact with the media, an inner electrode 23 and an outer electrode 24, the electrodes 23 and 24 being separated by an insulator 25. As with the prior art sensor the electrodes may be formed from stainless steel and the insulator 25 from PTFE, ceramic or other suitable material though these materials are mentioned by way of example and are not to be considered as limiting.

The sensor 20 is comprised of a number of different sections arranged along length L and configured to significantly improve performance over the prior art sensors mentioned. At or adjacent to connection end 20 is a reflection section 26 followed by a main waveguide section 27, an expansion section 28 and a tip section 29. Given that a sensor of this type is included in a switch intended for applications in which the distal end 22 of the switch will be exposed to media under high pressure, the sensor preferably further includes a pressure resisting section 30 situated within the main waveguide section 27. The tip section 29 is preferably domed in shape by projecting the inner electrode 23 out beyond the outer electrode 24 by an amount of around $\frac{1}{10}\lambda$ or less, and forming the insulation between the electrodes to encourage condensed liquids to drop off the distal end 22 of the sensor, the tip section preferably being provided with a thin coating of a suitable polymer such as, for example, polyfluorenylene ethynylene (PFE).

The reflection section 26 is configured to generate a resonant standing wave around the frequency $f_0$ in the main sensor body through a significant impedance change or mismatch, the impedance of this section being at least 1½ times that of the main waveguide and more preferably 3 to 4 times the impedance of the main waveguide section. The impedance mismatch may be achieved by evacuating the section or filling it with air or a low permittivity material such as foam, examples of which include a low dielectric open cell foam such as, for example, Cuming Microwave C-Stock or Eccostock FFP. The length dimension of the section 26 is preferably a multiple of $\frac{1}{4}\lambda$.

As can be seen from FIG. 2, the reflection section 26, pressure resisting section 30, expansion section 28 and tip section 29 have dimensions $X_1$, $X_3$, $X_5$ and $X_6$ respectively in the direction of L. Performance of the sensor is enhanced if $X_1$ is a multiple of $\frac{1}{4}\lambda$ while $X_3$, $X_5$ and $X_6$ are multiples of $\frac{1}{2}\lambda$. $X_2$ and $X_4$ which, in combination with $X_3$ define the length of the main waveguide section 27, also preferably comprise multiples of $\frac{1}{2}\lambda$.

By way of example only, an effective sensor may be provided in which the various sections have the following dimensions:

| Section | OD (mm) | ID (mm) | l (mm) | ε | f (GHz) | Z (ohm) |
|---|---|---|---|---|---|---|
| Reflection (26) | 20 | 1 | 8 | 1 | 9.1 | 179.7 |
| Main waveguide (27) | 7 | 2 | 69 | 2.1 | 14.7 | 51.9 |
| Pressure resisting (30) | 14 | 4 | 17.3 | 2.1 | 7.3 | 51.9 |
| Expansion section (28) | 20 | 6 | 17.3 | 2.1 | 5.1 | 49.8 |
| Tip section (29) | 20 | 6 | 1.3 | 2.1 | — | — | where OD is outside diameter, ID is inside diameter, l is length, ε is permittivity, f is cut-off frequency and Z is impedance.

As is well known by those skilled in the art, when a transverse electromagnetic wave (TEM) is transmitted along the sensor body from end 21 and reflected at the distal end 22, the amplitude and phase of the reflected wave will vary depending on the permittivity of the medium surrounding the distal end 22. This variation of permittivity may be determined using a time domain based approached or a frequency domain based approached, the latter being described in this instance with reference to FIG. 3, with the particular application of the sensor 20 to an industrial level switch application. Variations of amplitude and/or phase can then be compared with a threshold to, if appropriate, initiate a switching function.

Figure 3:
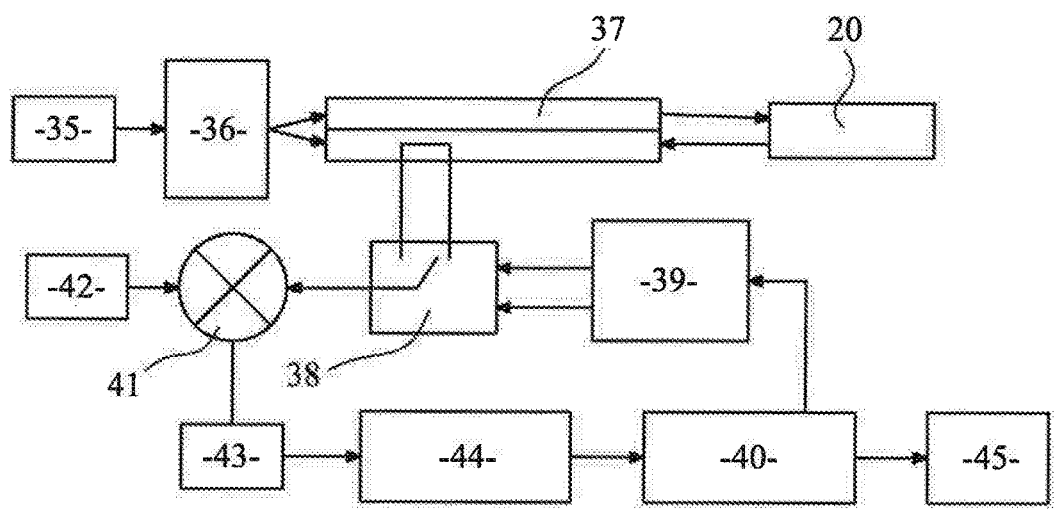
FIG. 3: shows a typical drive and processing circuit for use with an open-ended waveguide sensor used in a level switch application.

To avoid having to rely on high cost processing electronics, the high frequency received (reflected) signals from the sensor 20 are converted into lower frequency signals that can be processed using readily available and cost effective circuitry, an example of a suitable drive and processing circuit being shown in FIG. 3.

Figure 4A:
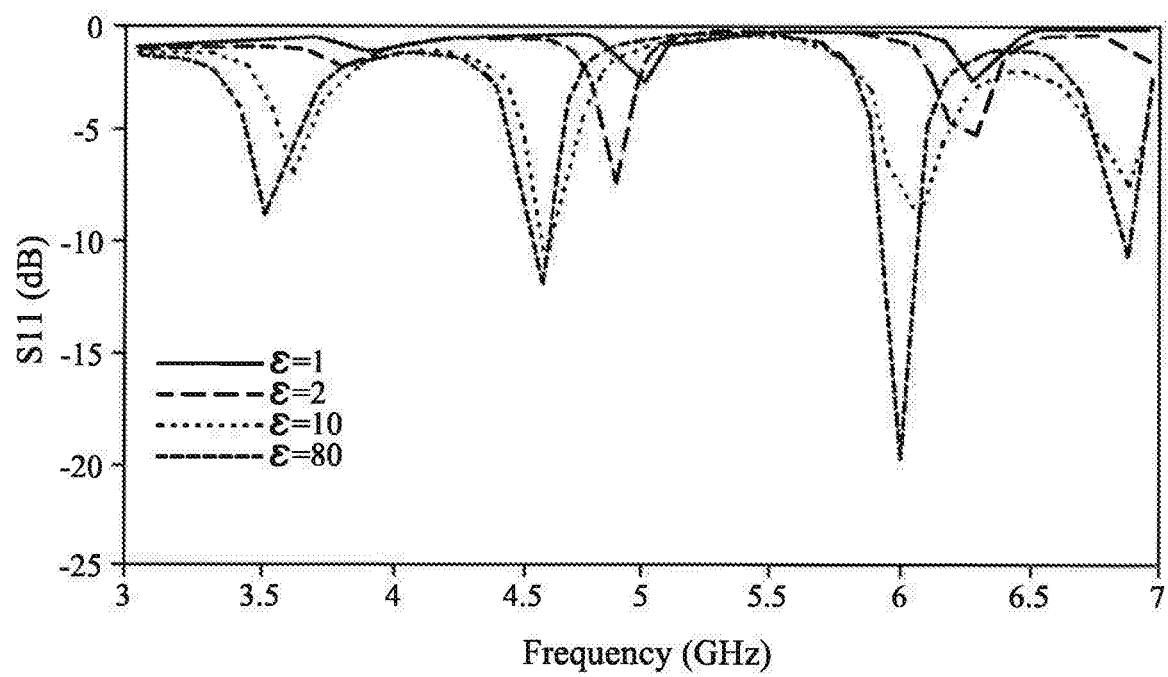
FIGS. 4A & 4B: show simulated comparisons of amplitudes of return losses of a sensor according to the invention, and a prior art sensor, respectively operating in media of differing permittivities.
Figure 4B:
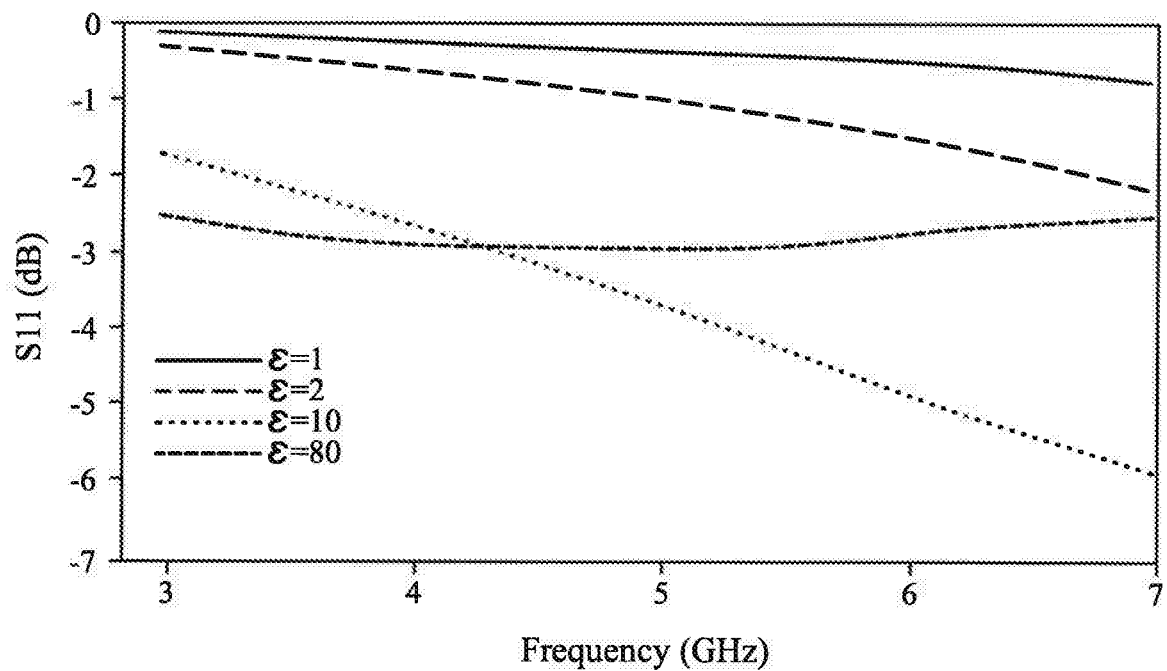
Figure 5A:
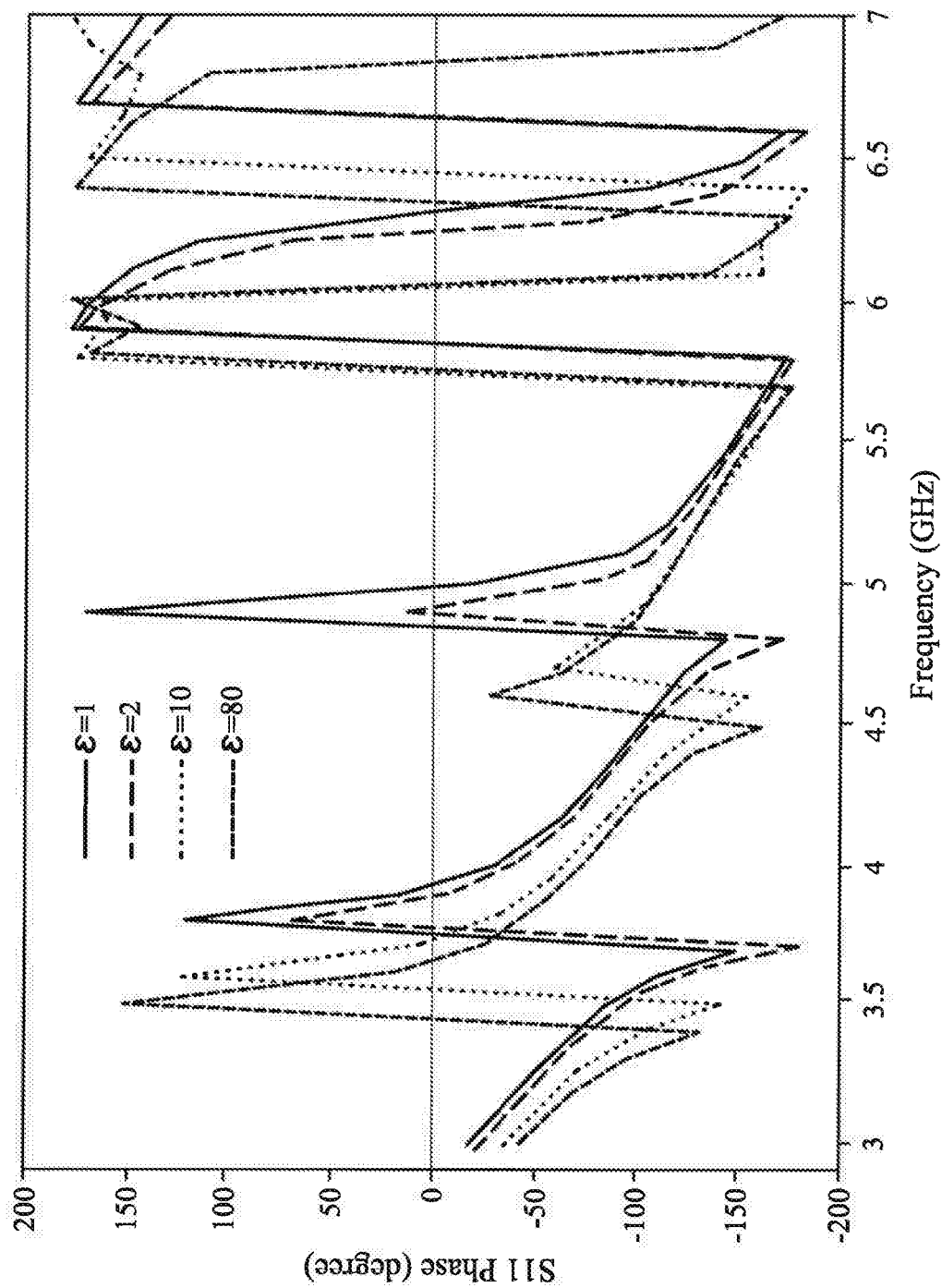
FIGS. 5A & 5B: show simulated comparisons of phases of return losses of a sensor according to the invention, and a prior art sensor, respectively operating in media of differing permittivities.
Figure 5B:
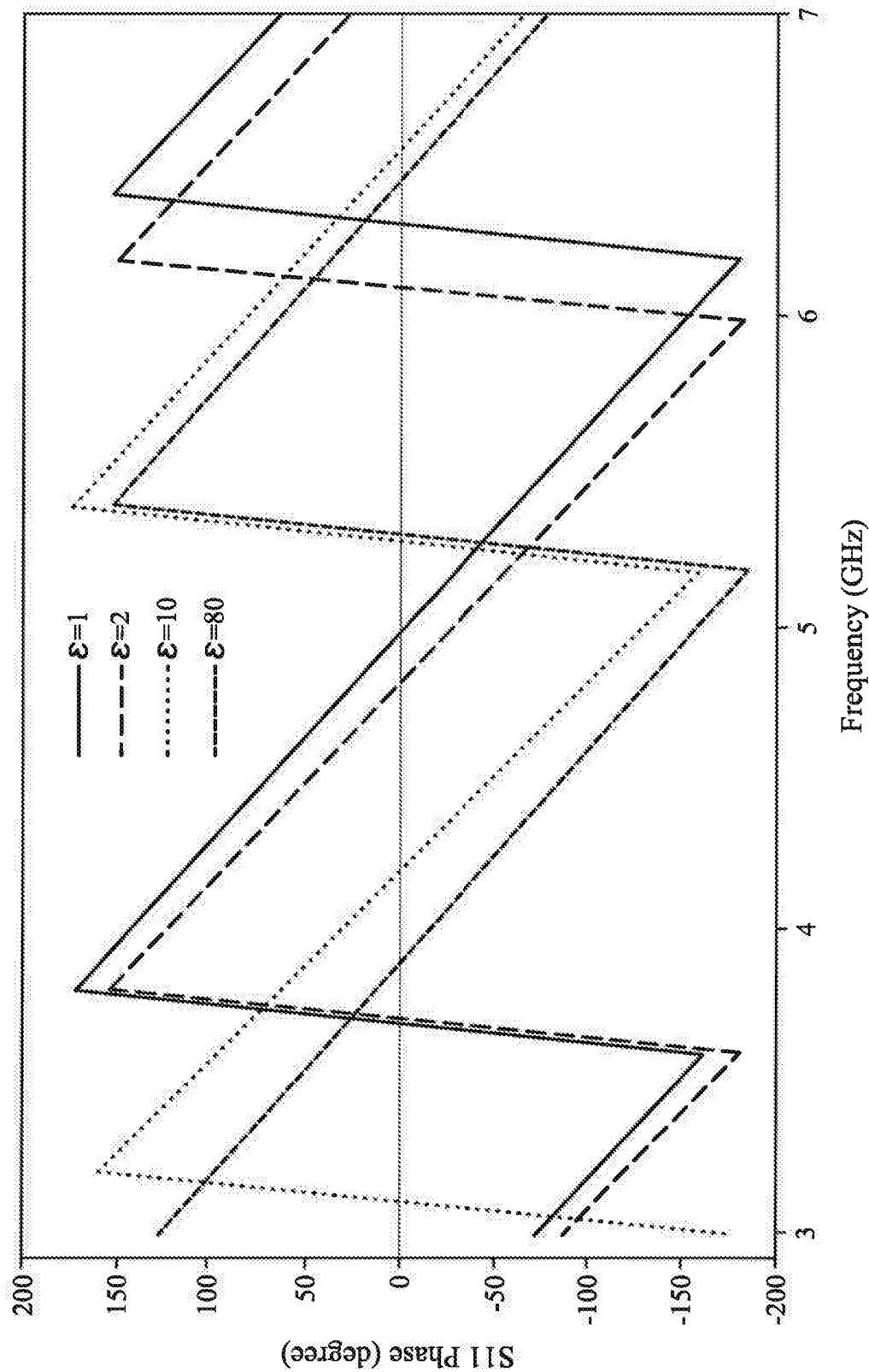

FIG. 3 shows an example of a known one port vector network analyser circuit which comprises a voltage controlled oscillator 35 configured to generate input signals in the form of sinusoidal waves at a group of frequency points, say 1024 points, within the frequency band permitted for radar tank level measurement [5.7-6.8 GHz]. For each frequency point the sinusoidal wave passes through a radio frequency amplifier 36 to smooth fluctuations in the input signal, and a directional coupler 37 which directs part of the input power to the sensor 20 and part to radio frequency power switch 38 as a reference signal, an example of a suitable switch being an HMC547 from Analog Devices Inc. The signal reflected from distal end 22 of the sensor returns through the directional coupler 37 to the switch 38, the control line to which is periodically toggled using CMOS control circuit 39 by microcontroller 40. Toggling of the switch 38 by circuit 39 causes the reference signal from drive oscillator 35 to be interspersed with reflected signals from the distal end 22 of sensor 20. The mixer 41 combines the signal from the switch 38 with a signal from a local oscillator 42 and generates a signal of intermediate frequency which is directed to low pass filter 43 which removes the high frequency components. The low frequency signals are then passed through amplifier 44 having representative in-phase and quadrature outputs which are converted into digital signals in the microcontroller 40 and used to derive the amplitude and phase of the received signals. Variations in the signals can then be compared with thresholds to indicate the presence or not of a switching point at 45, one example being of whether the distal end 22 is 'wet' or 'dry'. This output can be communicated to a control room or into a control network. The outcome of transmitting signals at the various frequency steps can be seen in FIGS. 4 and 5 wherein the performance of a sensor 20 is simulated and compared with the simulated performance of a prior art sensor of comparable dimensions (OD=20 mm, ID=6 mm, Z=49.8 ohm, f=6.0 GHz). These FIGS. show, respectively, the amplitudes and phases of return losses of four different media having permittivities of 1, 2, 10 & 80—a range which covers most applications expected to be encountered in industrial interface detection. Comparing the performance of a switch embodying the prior art sensor with a switch embodying a sensor according to the invention, it can be seen that the switch according to the invention shows a far greater change in both amplitude and phase with changes in permittivity. This is particularly so when the drive frequency is close to the designed mid-point frequency $f_0$ but it can also be seen that distinct separations of both amplitude and phase can be observed at different frequency points and thus switching point decisions can be made at these points as well.

Based on the differences of amplitude and phase for the return losses, and the electronic circuit design, a level switch according to the invention can be configured to operate by observing an amplitude difference of the return loss, by observing an amplitude and frequency difference of the return loss, by observing an amplitude, phase, and frequency difference of the return loss, by comparing a permittivity difference derived from the return loss with reference permittivities held in memory and by comparing an impedance difference derived from the returned loss with the reference impedance data held in memory.

Whilst the above description may be interpreted as applying to a level switch mounted through an aperture in a process vessel, the invention may also be applied to a point level switch mounted in a non-penetrating manner on the outer surface of a vessel which is formed from a non-conducting material such as, for example, plastic, glass or ceramic; or mounted on a non-conducting window included in the wall of a vessel otherwise formed from a conducting material. In such situations a lower design frequency $f_0$, say around 3.5 GHz is preferred as it will allow the microwave energy to penetrate the container wall and generate a large effective sensing volume more easily.

The invention claimed is:

1. A level switch configured to initiate a switching function in the event of a change of medium in contact with said switch, said switch including:
    a sensor having a connection end and a distal end, and being configured to sense a change of medium in contact with the distal end of said sensor; and
    drive and processing electronics connected to the connection end of the sensor and configured to provide drive signals to the connection end of said sensor, to receive and process received signals resulting from reflection of the drive signals at the distal end of said sensor, and to initiate a switching function dependent on an amplitude and/or phase difference in frequency of said received signals;
    wherein said sensor comprises an open ended microwave waveguide formed by an outer electrode and an inner electrode held within said outer electrode with an electrical insulator there-between, said sensor having a length L; and
    wherein said sensor is configured to create an impedance mismatch at or adjacent to said connection end.

2. A level switch as claimed in claim 1 wherein said sensor has a main waveguide section of impedance Z and wherein said impedance mismatch comprises a reflection section configured to have an impedance of greater than 1.5 Z.

3. A level switch as claimed in claim 2 wherein said reflection section is configured to have an impedance of substantially 4 Z.

4. A level switch as claimed in claim 1 wherein said reflection section comprises a cavity which is evacuated, or filled with air or a low permittivity foamed material.

5. A level switch as claimed in claim 1 wherein said sensor is configured to operate within a selected frequency band having a substantially central frequency $f_0$ with a wavelength $\lambda$ and wherein said impedance mismatch has a dimension in the direction of length L of a multiple of substantially ¼ $\lambda$.

6. A level switch as claimed in claim 5 wherein said main waveguide section has a dimension in the direction of L which is a multiple of ½ $\lambda$.

7. A level switch as claimed in claim 5 wherein said sensor further includes a pressure resisting section extending between said inner and outer electrodes, said pressure resisting section having a dimension in the direction of L which is a multiple of ½ $\lambda$.

8. A level switch as claimed in claim 7 wherein said pressure resisting section is positioned within the length of said main waveguide section.

9. A level switch as claimed in claim 8 wherein the distance between an edge of said pressure resistant section and an end of said main waveguide section is a multiple of ½ $\lambda$.

10. A level switch as claimed in claim 1 further including an expansion section formed at said distal end in which said inner electrode is expanded in diameter and said outer electrode is reduced in thickness to accommodate the expansion.

11. A level switch as claimed in claim 10 wherein the dimension of said expansion section in the direction of L is a multiple of ½ $\lambda$.

12. A level switch as claimed in claim 11 wherein at said distal end said inner electrode projects beyond said outer electrode in the direction of L by an amount of the order of 1/10 $\lambda$.

13. A level switch as claimed in claim 1 wherein an insulating coating is provided over said distal end to prevent short-circuiting between said inner and outer conductors.

14. A level switch as claimed in claim 1 wherein said outer electrode and said inner electrode are substantially co-axial.

15. A level switch as claimed in claim 1 wherein said processing electronics is configured to reduce the frequencies of said received signals before processing into a determination of a switching point.

16. A level switch configured to initiate a switching function in the event of a change of medium in contact with said switch, said switch including:
    A sensor having a connection end and a distal end, and being configured to sense a change of medium in contact with the distal end of said sensor; and
    drive and processing electronics connected to the connection end of the sensor and configured and configured to provide drive signals to said sensor, to receive and process received signals from said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, said sensor having a length L, and wherein said sensor is configured to operate within a frequency band having a frequency $f_0$ with wavelength $\lambda$ located substantially centrally within said band, said sensor including at least one impedance mismatch having a dimension in the direction of length L related to $\lambda$.

17. A level switch configured to initiate a switching function in the event of a change of medium at a level of said switch, said switch including:

a sensor having a connection end and a distal end, and being configured operable to sense a change of medium at a level of the distal end of said sensor; and drive and processing electronics connected to the connection end of the sensor and configured to provide drive signals to the connection end of said sensor, to receive and process received signals resulting from reflection of the drive signals at the distal end of said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, the distal end of said sensor being configured for mounting in substantial contact with a wall of a non-conductive vessel containing said medium or in contact with a non-conductive window provided in a wall of a vessel containing said medium, said sensor having a length L, wherein said sensor is configured to create an impedance mismatch at or adjacent to said connection end.

18. A level switch configured to initiate a switching function in the event of a change of medium at a level of said switch, said switch including:

a sensor having a connection end and a distal end, and being configured to sense a change of medium at a level of the distal end of said sensor; and drive and processing electronics connected to the connection end of the sensor and configured to provide drive signals to the connection end of said sensor, to receive and process received signals resulting from reflection of the drive signals at the distal end of said sensor, and to initiate a switching function dependent on an amplitude and/or phase difference in frequency of said received signals, wherein said sensor comprises an open ended microwave waveguide formed by an outer electrode and an inner electrode held within said outer electrode with an electrical insulator there-between, the distal end of said sensor being configured for mounting in substantial contact with a wall of a non-conductive vessel containing said medium or in conduct with a non-conductive window provided in a wall of a vessel containing said medium, said sensor having a length L, and wherein said sensor is configured to operate within a frequency band having a frequency $f_0$ with wavelength $\lambda$ located substantially centrally within said band, said sensor including at least one impedance mismatch having a dimension in the direction of length L related to $\lambda$.

* * * * *